(12) United States Patent
Lippis

(10) Patent No.: US 7,780,243 B2
(45) Date of Patent: Aug. 24, 2010

(54) WHEEL HUB

(75) Inventor: Daniel J. Lippis, Portland, OR (US)

(73) Assignee: Consolidated MetCo, Inc., Portland, OR (US)

( * ) Notice: Subject to any disclaimer, the term of this patent is extended or adjusted under 35 U.S.C. 154(b) by 185 days.

(21) Appl. No.: 12/074,191

(22) Filed: Mar. 3, 2008

(65) Prior Publication Data
US 2009/0218878 A1 Sep. 3, 2009

(51) Int. Cl.
*B60B 19/00* (2006.01)
*B60T 1/06* (2006.01)

(52) U.S. Cl. .................. 301/6.1; 301/6.8; 188/18 A; 188/218 XL

(58) Field of Classification Search .................. 301/6.1, 301/6.7–6.8, 105.1; 188/17, 18 A, 18 R, 188/218 R, 218 XL
See application file for complete search history.

(56) References Cited

U.S. PATENT DOCUMENTS

| | | | | |
|---|---|---|---|---|
| 4,699,433 A | * | 10/1987 | Kopp | 301/6.6 |
| 5,281,004 A | * | 1/1994 | O'Leary, Jr. | 301/105.1 |
| 5,921,633 A | * | 7/1999 | Neibling et al. | 301/6.1 |
| 6,076,896 A | * | 6/2000 | Bertetti et al. | 301/105.1 |
| 6,880,682 B2 | * | 4/2005 | Gotti et al. | 188/218 XL |
| 7,281,769 B2 | * | 10/2007 | Pete et al. | 301/105.1 |
| 2006/0091719 A1 | * | 5/2006 | Cowling et al. | 301/6.1 |

* cited by examiner

*Primary Examiner*—Jason R Bellinger
(74) *Attorney, Agent, or Firm*—Edward J. Brosius

(57) ABSTRACT

The invention is directed to outside diameter piloting apparatus and method for concentrically aligning a disc rotor to a wheel hub. The pitch circle diameter of the annular piloting features is greater than the pitch circle diameter of the rotor mounting fasteners and the wheel studs of the hub. The outside diameter piloting feature allows a hub section profile which is smooth and continuous between the inboard side of the wheel hub up to the mounting fastener apertures. This smooth and continuous profile reduces stresses and increases the fatigue life of the wheel hub.

3 Claims, 5 Drawing Sheets

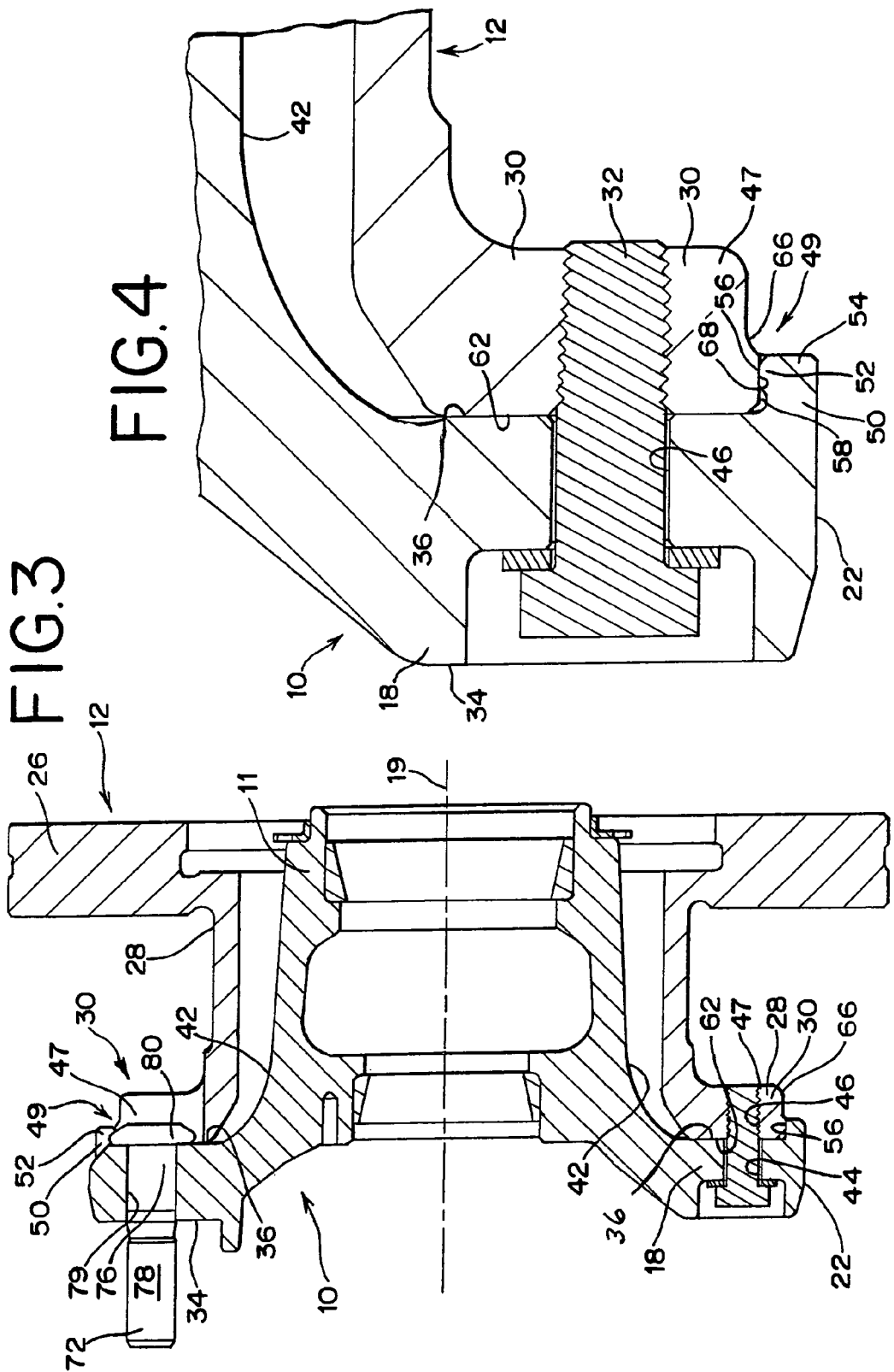

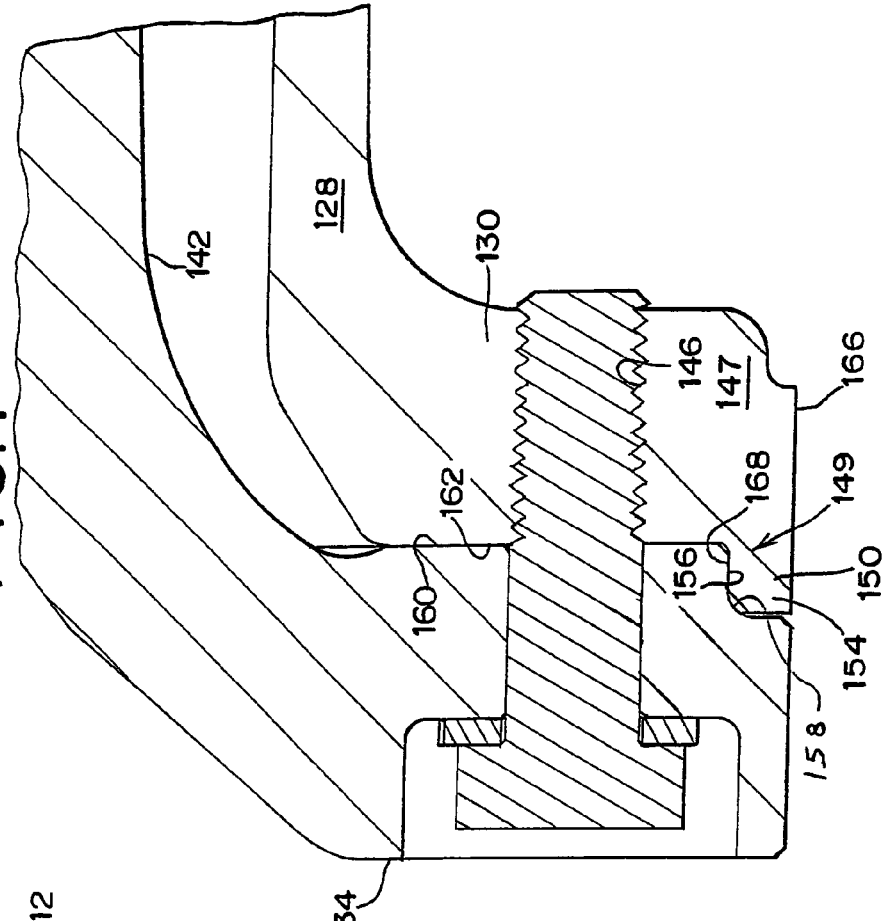
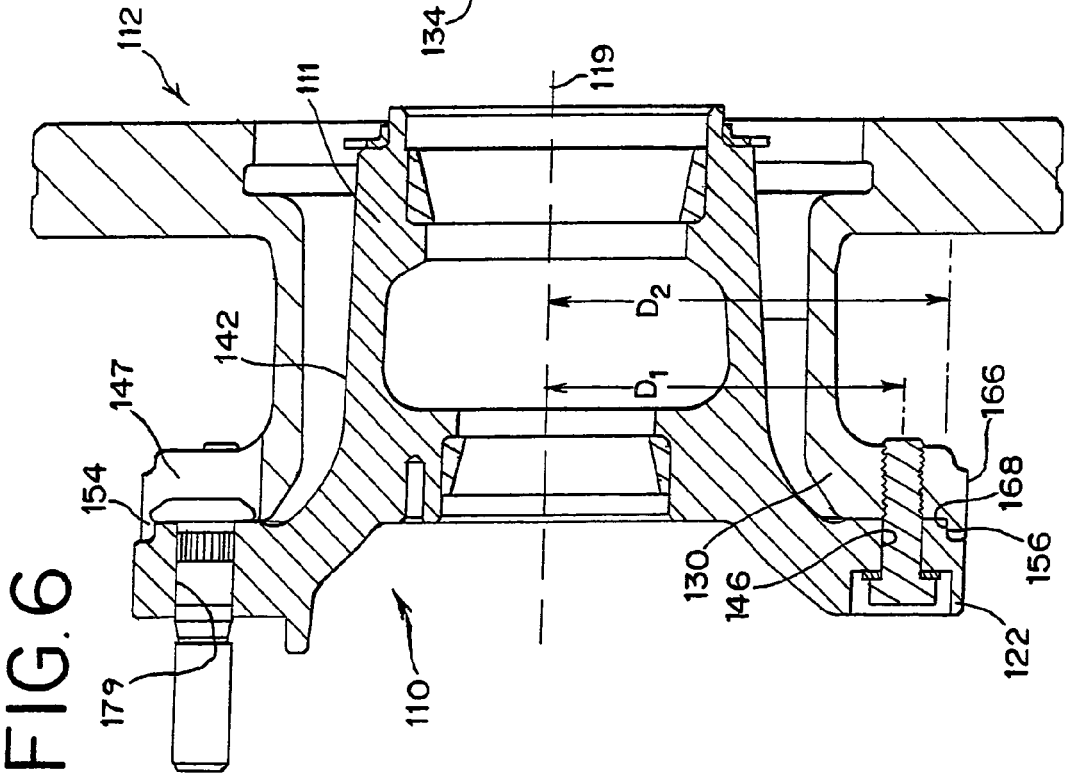

WHEEL HUB

FIELD OF THE INVENTION

Present invention relates generally to an apparatus and method to pilot and or concentrically mount a disc rotor to a wheel hub. The invention relates generally to piloting surfaces formed outside the mounting fasteners on each of the hub and disc rotor to radially align the disc rotor to the wheel hub to increase the fatigue life of the wheel hub.

BACKGROUND OF THE INVENTION

The present invention is designed to minimize radial run out experienced by the attachment of an inboard disc rotor to a wheel hub for such applications as heavy truck wheel ends. Radial run out is a concern when attaching a brake rotor to a wheel hub to prevent vibration caused by disc rotor imbalance. The brake rotor must be concentrically aligned with the wheel hub prior to securing the disc rotor to the hub. Fasteners attach the disc rotor to the hub by extending through holes formed in a disc rotor mounting flange of the hub and threadably engaging a hub mounting flange on the disc rotor. Vibration may occur due to the disc rotor having an incorrect concentric alignment with the axis of the hub.

The method used to pilot and/or center an inboard mounted disc rotor to a wheel hub requires a machined pilot diameter of annular shape on the disc rotor that interfaces with a machined pilot diameter of annular shape on the wheel hub. Prior art pilot features are disposed between the axis of the hub and the wheel studs or generally, at a smaller pitch circle diameter than the pitch circles for either the disc rotor mounting fasteners and the wheel studs of the hub. This placement of the pilot feature formed a discontinuous section thickness of the hub body and flange by continuous or individual mounting bosses, machined undercut or small radius features form on the inboard flange region of the wheel hub. These notches and stress risers in the hub flange reduced the fatigue life of the hub.

Wheel hubs undergo cyclical and mean stresses that may be concentrated at an inboard flange area of the wheel hub. The stresses are particularly concentrated at discontinuous section thicknesses of the hub especially when such stress risers are formed at a pitch circle diameter equal to or less than the pitch circle diameter of the fasteners on the hub connecting the disc rotor or wheels. The stress risers formed by the prior art pilot features have a compounding effect to the cyclical and mean stresses of the wheel hub increasing the stress level at those points and reducing the fatigue life of the wheel hub.

It is desirable to provide a design and method of piloting the disc rotor on the wheel hub by positioning pilot features outside the pitch circle diameters of either the fasteners or studs. A benefit of such a design is to reduce the effects of fatigue on the wheel hub. It is further desirable to provide a method of piloting the disc rotor on the wheel hub where in the pilot features do not create stress risers.

BRIEF SUMMARY OF THE INVENTION

One embodiment of the present invention is directed to a piloting feature formed having the wheel hub portion on the mounting flange at a pitch circle diameter greater than the pitch circle diameter of the disc rotor fasteners and surroundingly engaging a disc rotor portion on the brake rotor. The pitch circle diameter of the piloting feature may also be greater than the pitch circle diameter of the wheel studs which are press fitted into the mounting flange of the wheel hub. The pilot feature may be a continuous boss circumscribing a pilot diameter or, alternatively may be a plurality of individual bosses formed along an outer edge of the mounting flanges having the hub portion radially outside of the disc rotor portion for concentrically piloting the hub and disc rotor during assembly.

In an alternative embodiment, the outside pilot feature may be formed on the mounting flange of the disc rotor hub at a pitch circle diameter greater than the pitch circle diameter of the disc rotor fasteners for surroundingly engaging the hub portion of the pilot feature outside of the wheel studs on the wheel hub. The pilot feature on the disc rotor mounting flange may be a continuous ridge circumferentially formed around the outside perimeter of the disc rotor mounting flange or may be a plurality of individual bosses formed along the outside perimeter of the disc rotor mounting flange for engaging a pilot surface on the hub mounting flange. The pilot surface on the hub may be notched into the hub mounting flange to engage the disc rotor portion and provide a smooth profile around the circumference of the assembly.

The placement of the pilot features at a diameter greater than the wheel stud hole diameter helps eliminates stress risers between the axis and the wheel stud holes to increase fatigue life of the hub. Forming the pilot features outside the fasteners and studs reduces the notches, machined undercuts and stress risers to provide a continuous section thickness in the hub flange between the body and the mounting holes.

BRIEF DESCRIPTION OF THE SEVERAL VIEWS OF THE DRAWING

FIG. 3 is a detail section view of the first embodiment taken at approximately 3-3 of FIG. 2.

FIG. 4 is an enlarged detail section view of the first embodiment showing the rotor pilot adjacent to the rotor fastener.

FIG. 6 is a detail section view of the second embodiment taken at approximately 6-6 of FIG. 5.

FIG. 7 is an enlarged detail section view of the second embodiment showing the disc rotor pilot adjacent to the disc rotor fastener.

DETAILED DESCRIPTION OF THE INVENTION

Figure 1:
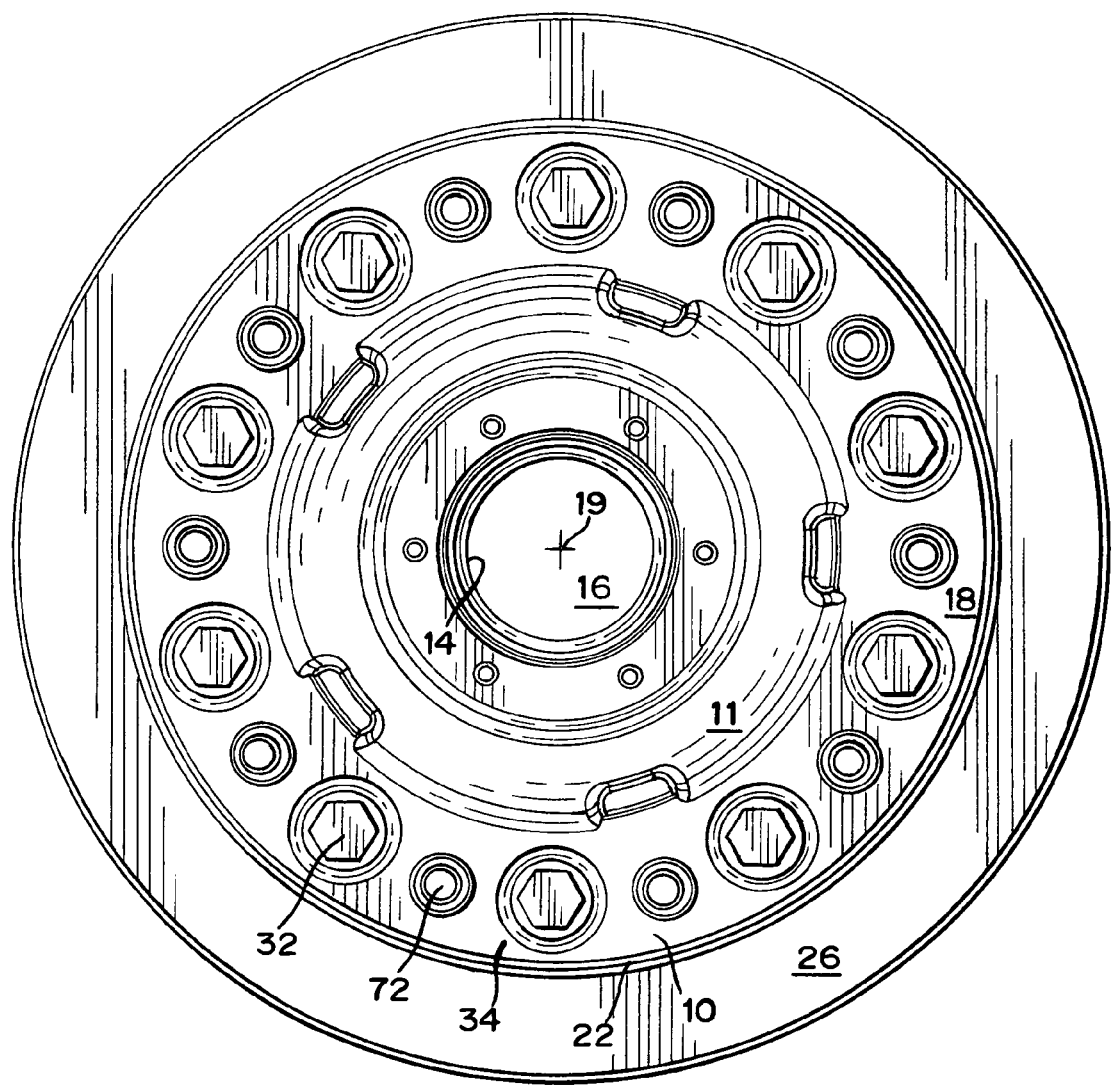
FIG. 1 is a front view of a hub concentrically mounted to a disc rotor hub.

FIGS. 1 illustrates a brake rotor assembled to a wheel hub. It should be understood that drive, steer and trailer hubs are nearly identical with respect to the present invention. These assemblies comprise a hub interfacing between the vehicle axle and the wheel and a disc rotor mounted on the hub for applying a braking force. For purposes of this description, the hub portion of the assembly go will be referred to as a hub 10 and shall indicate either a drive, steer or trailer hub. Generally an inboard direction is referred to as from the wheel inward toward the hub to the disc rotor and to the center of the vehicle and the outboard direction is referred to as from the center of the vehicle outward past the disc rotor, the hub and directed toward the wheel. Inward direction refers to a radial direction toward the axis of the hub and an outward direction refers to a radial direction out from the axis of the hub.

Referring to FIG. 1, a hub 10 is illustrated concentrically attached to a disc rotor 12. The hub 10 has a generally cylindrically shaped body 11 having an inner bore 14 for attachment to an axle (not shown) and a generally hollow interior 16 of the hub 10. The disc rotor 12 is attached by fasteners 32 extending from the outboard side of the hub flange 18 inwardly to engage the disc rotor 12. Wheel studs 72 extend outwardly from the hub flange 18 for securing the wheels (not shown) to the hub 10. The disc rotor fasteners 32 and wheel studs 72 are attached to the hub 10 at a first pitch diameter from the hub axis 19.

Figure 2:
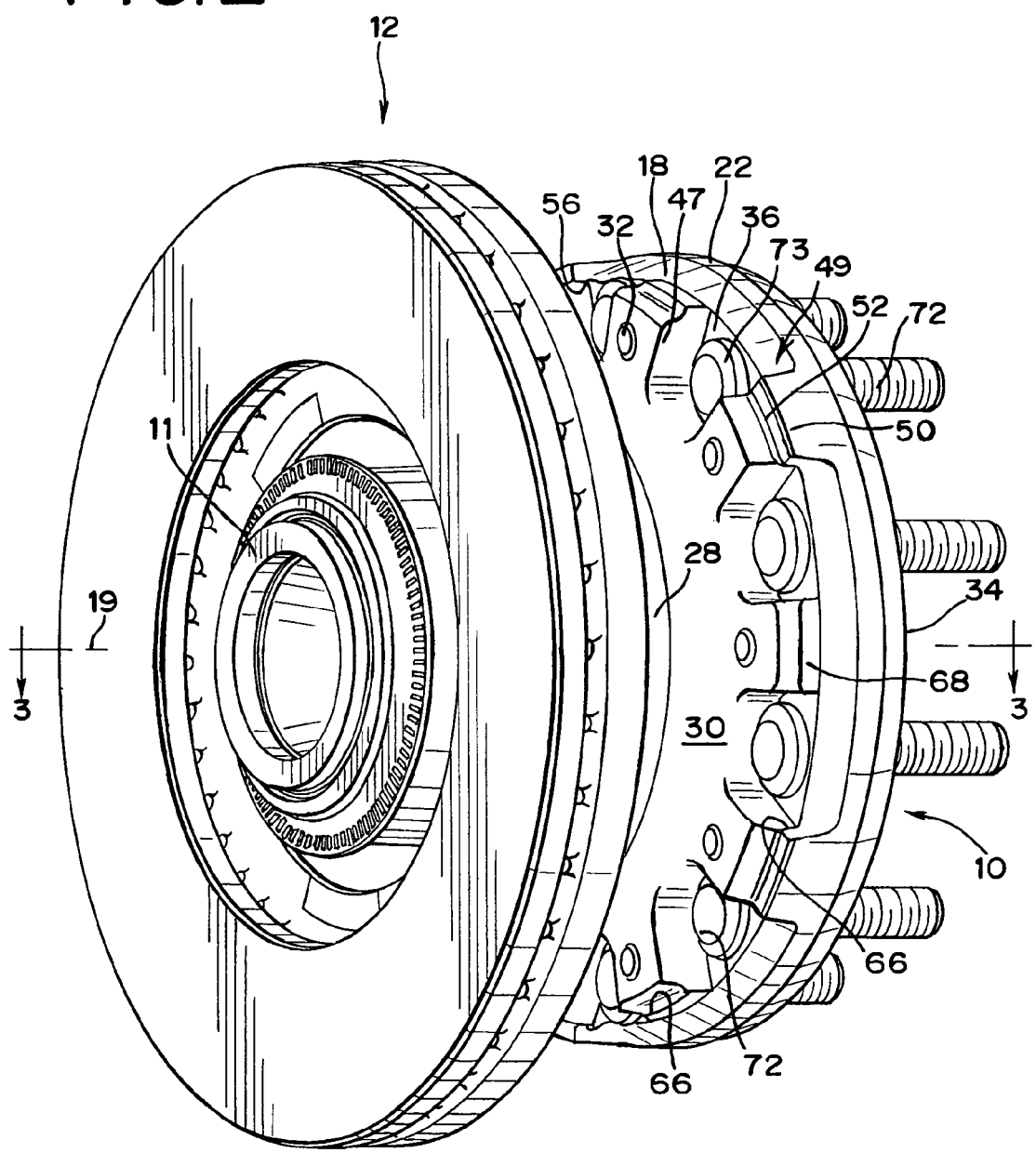
FIG. 2 is a perspective view of the first embodiment showing the disc rotor mounted to the hub.

Referring to FIG. 2, the disc rotor flange 30 is adapted to attach to the hub flange 18 on the wheel hub 10. The disc rotor flange 30 is attached to the hub flange 18 by the threaded disc rotor fasteners 32 extending through the hub flange 18 and threadably engaging the disc rotor flange 30. The disc rotor flange has a series of outwardly projecting spokes 47 to engage the fasteners 32 and allow access to the wheel studs 72 at the inboard side of the hub flange. The wheel studs 72 have a head portion 73 bearing against the hub flange 18.

Continuing to refer to FIG. 2, the concentric disc rotor pilot 49 comprises a hub portion* and a disc rotor portion*. The hub portion comprises a plurality of hub pilot bosses 50 formed circumferentially around the hub flange 18. Each of the hub pilot bosses 50 is formed at a second pitch diameter with respect to the axis 19 of the hub 10. The hub pilot boss 50 is formed in a radially outward position with respect to disc rotor mounting holes 44 (FIG. 3). The hub pilot boss 50 extends inboard from the hub flange surface 36. Each hub pilot boss is positioned to engage a spoke 47 on the disc rotor flange. It should be understood the hub pilot bosses 50 may be positioned to engage three or more alternating spokes 47 or alternatively, a boss 50 may be formed to correspond with and engage each spoke depending on the design characteristics. Each hub pilot boss 50 comprises a radially inward extending nub 52 for engaging an outer edge 66 of the disc rotor flange 30. The piloting feature 49 is formed between the outer edge 66 and boss 50 for concentrically aligning the disc rotor 12 with the hub 10.

Referring to FIG. 3, the disc rotor 12 comprises a brake engaging disc rotor 26 attached to a cylindrical rotor sleeve 28 and a disc rotor flange 30 extending outward from the sleeve 28. The hub flange 18 as an outboard surface 34 and an inboard surface 36. The hub flange 18 has a smooth, generally tapering inboard section 42 and a smooth hub outer surface 22. The disc rotor mounting aperture 44 in the spoke 47 is adapted for threadably receiving the fastener 32 for securing the disc rotor 12 to the hub 10. The disc rotor mounting aperture 44 is positioned at a first pitch diameter with respect to the axis 19 of the hub 10. The boss 50 is positioned at second pitch diameter spaced radially outward from the first pitch diameter. The first pitch diameter is intermediate the second pitch diameter and the axis 19. Boss 50 engages disc rotor flange 30 at outside edge 68 (FIG. 4) radially outward from the disc rotor aperture 44. Each boss 50 is formed at the second pitch diameter with respect to the hub axis 19. The first pitch diameter is intermediate the second pitch diameter and the axis 19. The second pitch diameter is greater than the first pitch diameter.

Continuing to refer to FIG. 3, the hub inboard section 42 further has an inboard hub flange disc rotor mounting surface 36 which is machined to be perpendicular to the axis 19. The disc rotor flange 30 has an outboard disc rotor flange surface 62 machined to be perpendicular to the axis 19 for engagement to inboard hub flange surface 36. The rotor flange 30 has a plurality of disc rotor apertures 46 formed at the first pitch diameter with respect to the axis 19 for alignment with disc rotor mounting holes 44. The disc rotor flange 30 further comprises an outer disc rotor flange edge 66 having a disc rotor pilot terminating at a hub pilot 68. Hub pilot 68 is precisely machined to the second pitch diameter for engaging the disc rotor pilot 56 to concentrically align the disc rotor 12 to the wheel hub 10.

Continuing to refer to FIG. 3, the disc rotor 12 is attached to the hub 10 with mounting fasteners 32 shown recessed in the outboard surface of hub flange 18. The fasteners 32 threadably engage the disc rotor flange 30 to secure the hub to the disc rotor. Inboard flange surface 36 bears against outboard disc rotor flange surface 62 to axially align the disc rotor to the hub 10. Disc rotor pilot 56 on the hub is surroundingly engaging the disc rotor 12 in the first embodiment. It should be understood when the disc rotor 12 is attached to the hub 10, no additional load is imparted between the disc rotor 12 and the hub 10 at the pilot feature.

Continuing to refer to FIG. 3, the detailed section view showing the interface of the hub flange 18 to the disc rotor flange 30 is illustrated showing a wheel mounting stud 72. The wheel mounting stud 72 is pressed into the hub flange 18 at stud hole 79 formed preferably at the first pitch diameter. The wheel mounting stud 72 is held by a spline section 76 on the stud shank 78 engaging the hub flange 18. Stud shank 78 further comprises a stud flange 80 for engaging hub flange 18. The piloting feature 49 concentrically aligns the disc rotor 12 to the hub 10.

Referring to FIG. 4, nub 52 on boss 50 is machined to form disc rotor pilot 56 and a pilot cavity 58. Boss 50 extends axially inboard on tab 54 to form disc rotor pilot 56 precisely machined to the second pitch diameter for concentrically aligning the disc rotor 12 to the wheel hub 10. The disc rotor 12 has a hub pilot 68 on the outer edge 66. Hub pilot 68 is precision machined at the second pilot diameter outwardly from the disc rotor mounting aperture 46.

Continuing to refer to FIG. 4, piloting feature 49 comprises a disc rotor pilot 56 surroundingly engaging rotor 12 at hub pilot 68. The hub 12 is attached to the disc rotor 12 by rotor fastener 32 recessed into outboard surface 34 and extending through aperture 46 to threadably engage rotor flange 30 at spoke 47. The smooth hub surface 42 extends to the hub flange surface 60 bearing against rotor flange surface 62. Outer surface 22 on hub 10 forms the outer perimeter of the hub-disc rotor assembly.

Figure 5:
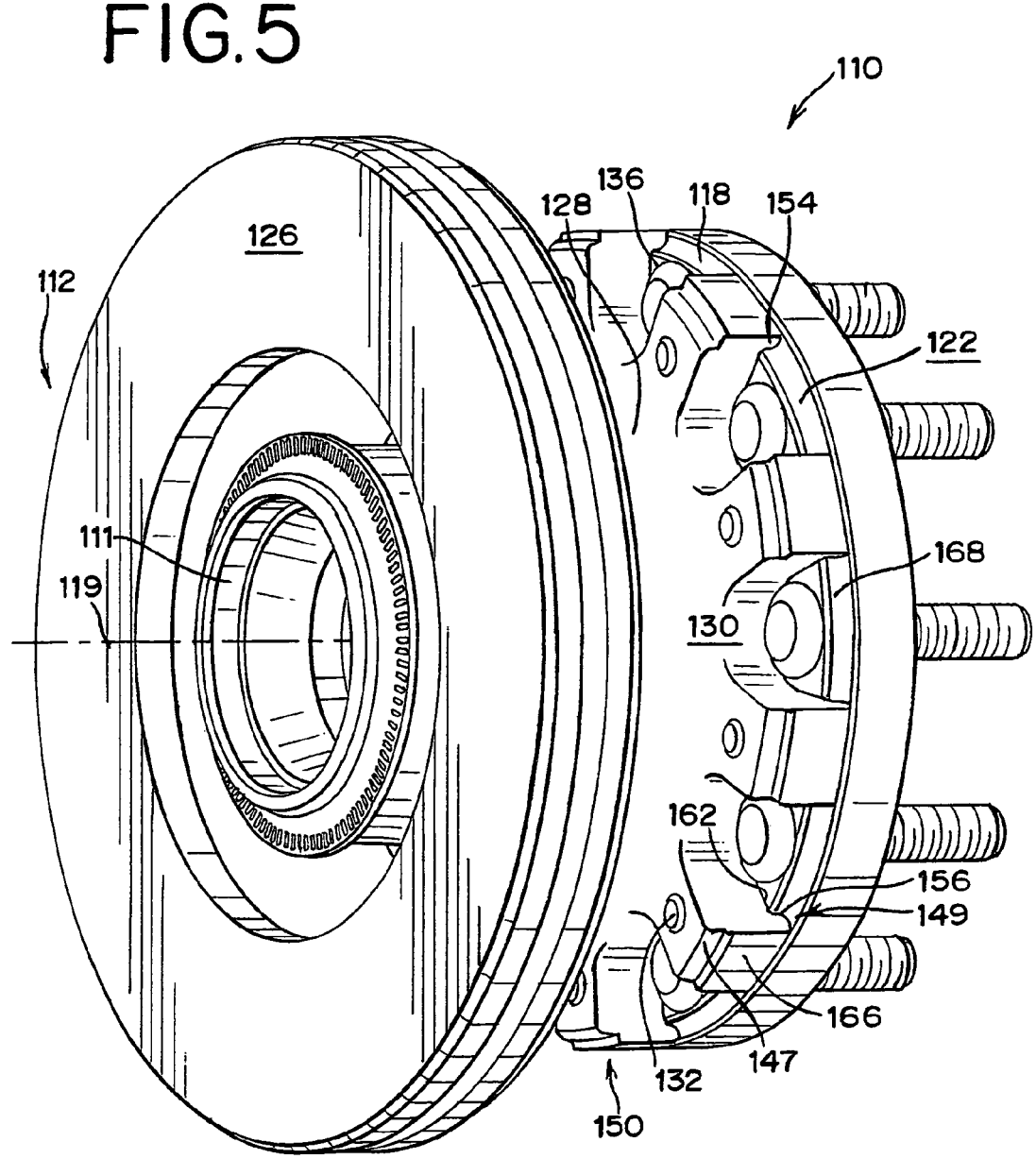
FIG. 5 is a perspective view of the second embodiment of the disc rotor pilot showing the disc rotor mounted to the hub.

Referring to FIG. 5, an alternative embodiment of the present invention is illustrated showing the hub 110 mounted to the disc rotor 112. The hub 110 and disc rotor 112 are concentrically aligned by an annular disc rotor pilot 149 comprising a boss 150 formed on the disc rotor flange 130. Boss 150 is formed at a second pitch diameter with respect to hub axis 119 in a radially outward position with respect to disc rotor fasteners 132. The boss 150 is illustrated as a plurality of tabs 154 formed in a circumferential arrangement for surrounding the hub flange 118 and engaging hub flange 118 on the outer edge 122. Rotor sleeve 128 supports rotor hub 130 formed into spokes 147 engaged by fasteners 132. Rotor boss 150 on spoke 147 extends outboardly from the disc rotor 112 adjacent the outer edge 166 of disc rotor flange 130.

Continuing to refer to FIG. 5, the hub flange 118 comprises an outer edge 122 having an outer disc rotor pilot 156 precisely channeled into the inboard flange surface 136. When assembled, the disc rotor 112 and hub 110 are concentrically aligned by the pilots 156, 168. The disc rotor 112 is piloted to a concentric position with respect to the hub 110 by the disc rotor pilot 156 surroundingly engaging the hub pilot 168.

Referring to FIG. 6, the disc rotor flange 130 extends outwardly beyond the aperture 146 and engages the hub 110 with an axial facing hub pilot 168 for engaging the outside of the hub flange 118. The hub pilot 168 on the disc rotor 112 is surroundingly engaging the hub 110 in the second embodiment. Hub 110 has smooth continuous, tapering inboard section 142 extending from hub body 111 to hub flange 118.

Tabs 154 are outside the disc rotor pilot 156. The disc rotor pilot 156 is formed as a channel 158 machined in the outer edge 122 to substantially align the outer edge 166 of the disc rotor flange 130 with the outer edge 122 of the hub flange 118. The mounting fasteners 132 are extended through the hub flange to threadably engage the disc rotor flange 130 at spokes 147.

Continuing to refer to FIG. 6, disc rotor mounting aperture 146 and the stud holes 179 may be formed at the first pitch diameter or alternatively, the disc rotor mounting apertures 146 may be formed at a pitch diameter having a different dimension from the first pitch diameter D1 but smaller than the second pitch diameter D2 of the pilot feature. The outer edge 122 may have a continuous disc rotor pilot 156 concentrically surrounding the hub flange 118 or may comprise a plurality of tabs 154 as shown, extending from the outer edge of the hub flange and disposed at positions to engage the hub pilot on the disc rotor 112.

Referring to FIG. 7, the disc rotor pilot boss 150 extends in an outboard direction from the disc rotor flange surface 162 and terminates with a tab 154 having an inward positioned hub pilot 168. Hub flange 118 is channeled at groove 158 to form the disc rotor pilot 156. The hub pilot 168 is formed at the second pitch diameter for engaging the disc rotor pilot 156 on the hub flange 118. After engagement at the piloting feature 149 the rotor fasteners 132 are inserted through the hub flange 134 to engage the rotor flange 130 on rotor sleeve 128. Hub flange 134 has a continuous, tapering inboard section 142 extending to rotor fastener 132.

In the first embodiment, the disc rotor flange 30 fits radially inside the disc rotor pilot 56 of the hub 10. The pilot 49 may comprise a continuous raised boss 50 on the hub having a rotor pilot 56 which may be formed on a plurality of tabs 52 for surroundingly engaging the disc rotor 12. The pilot 49 further comprises a hub pilot 68 on the rotor 12. The hub pilot 68 and the rotor pilot 56 are aligned to engage each other and pilot the disc rotor to a circumferential orientation to the hub.

In the second embodiment, the hub mounting flange 118 fits circumferentially inside the hub pilot 168 on the disc rotor flange 130. The disc rotor flange may have a plurality of spokes 147 extending radially outward from a position outside the first pilot diameter terminating in a tab comprising a hub pilot 168 that engages the hub at the disc rotor pilot 156.

The present invention has been shown and described with reference to the foregoing exemplary embodiments. It is to be understood, however, that other forms, details, and embodiments may be made without departing from the spirit and scope of the invention which is defined in the following claims.

We claim:

1. A pilot assembly comprising:
    a wheel hub having a body, an axis and a hub flange, the hub flange on the hub body, the hub flange comprising a rotor pilot and an outer edge, the rotor pilot on the hub flange adjacent the outer edge; and
    a rotor comprising a rotor sleeve, a rotor flange extending radially from the sleeve, the rotor attached to the wheel hub, the rotor flange comprising a hub pilot and an outer edge, wherein the hub pilot is adapted to interface with the rotor pilot to concentrically align the hub to the rotor during attachment,
    and wherein the rotor pilot further comprising a plurality of inboard extending tabs, each tab having a rotor pilot segment thereon, a plurality of outboard extending spokes on the rotor flange, each spoke having a hub pilot segment thereon, the tabs on the hub aligned and disposed to engage the spoke on the rotor at the respective pilots.

2. The invention of claim 1, wherein the rotor pilot is formed at a pilot diameter that surroundingly engages the hub pilot.

3. The invention of claim 1, wherein the hub pilot is formed at a pilot diameter that surroundingly engages the rotor pilot.

* * * * *